(No Model.) 2 Sheets—Sheet 1.

E. McCOY & C. B. HODGES.
LUBRICATOR.

No. 418,139. Patented Dec. 24, 1889.

WITNESSES
Samuel E. Thomas
M. B. O'Dogherty

INVENTOR
Elijah McCoy
Clarence B. Hodges
By C.W.W. Leggett, Attorney (No Model.) 2 Sheets—Sheet 2.

E. McCOY & C. B. HODGES.
LUBRICATOR.

No. 418,139. Patented Dec. 24, 1889.

WITNESSES
Samuel E. Thomas
M. B. O'Dogherty

INVENTOR
Elijah McCoy
Clarence B. Hodges
By W. W. Jeffers, ATTORNEY.

N. PETERS, Photo-Lithographer, Washington, D. C.

UNITED STATES PATENT OFFICE.

ELIJAH McCOY AND CLARENCE B. HODGES, OF DETROIT, MICHIGAN, ASSIGNORS TO CHARLES C. HODGES AND HENRY C. HODGES, OF SAME PLACE.

LUBRICATOR.

SPECIFICATION forming part of Letters Patent No. 418,139, dated December 24, 1889.

Application filed July 26, 1888. Serial No. 281,112. (No model.)

*To all whom it may concern:*

Be it known that we, ELIJAH McCOY and CLARENCE B. HODGES, citizens of the United States, residing at Detroit, county of Wayne, State of Michigan, have invented a certain new and useful Improvement in Lubricators; and we declare the following to be a full, clear, and exact description of the invention, such as will enable others skilled in the art to which it appertains to make and use the same, reference being had to the accompanying drawings, which form a part of this specification.

Figure 1:
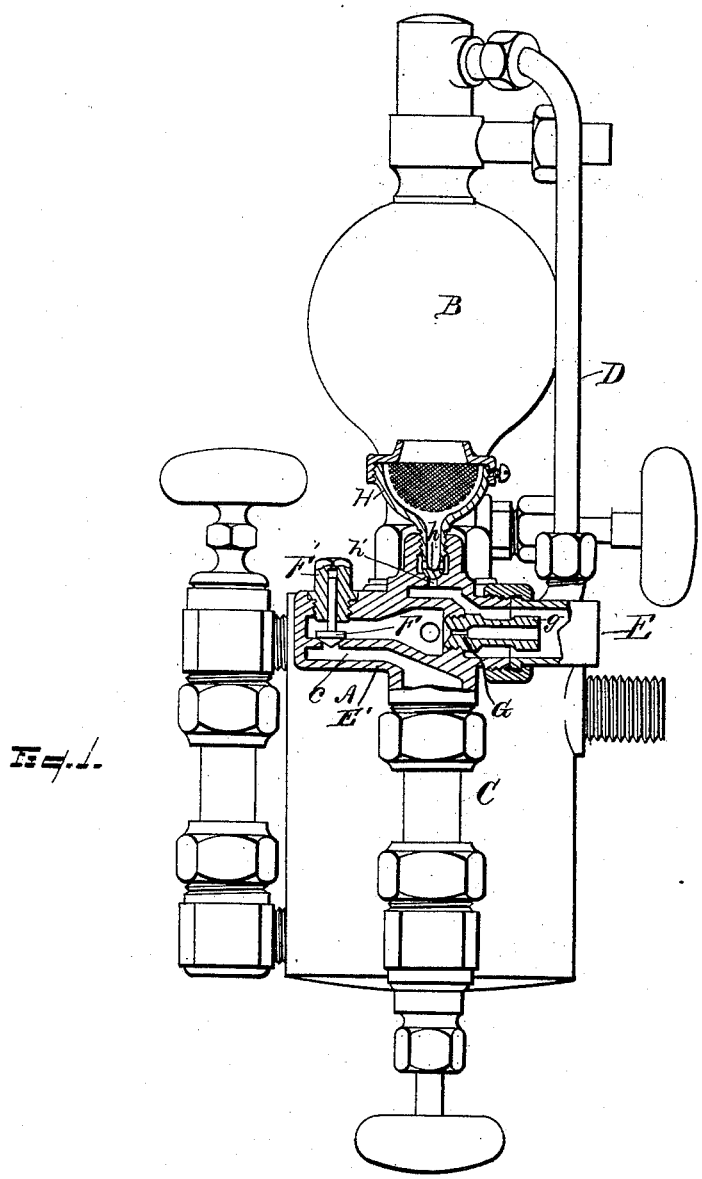
Figure 2:
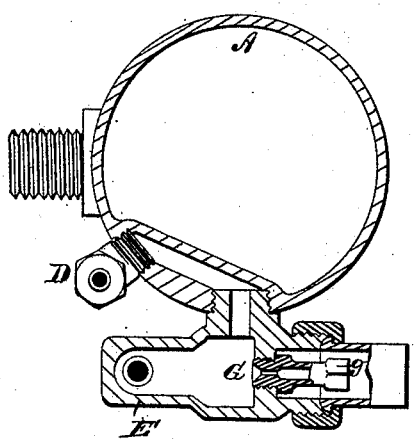
Figure 3:
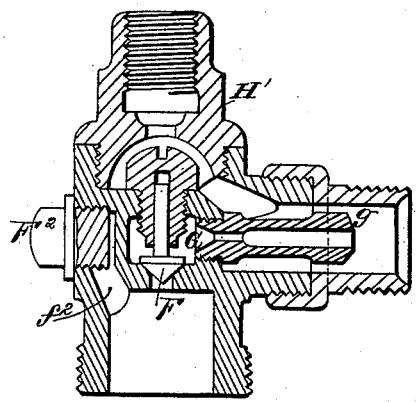

In the drawings, Figure 1 is a view in elevation and section of a lubricator embodying our invention. Fig. 2 is a sectional view by a horizontal plane passed through the oil-exit passage. Fig. 3 illustrates a variation of the invention.

In the construction of locomotive-lubricators it has heretofore been customary to provide them with valves which may be closed in case the sight-feed glass becomes broken. This has, however, been usually accomplished by hand, and so has required the engineer to close the valves after the damage has ensued.

It is the purpose of this invention to provide a lubricator with a check-valve adapted to close automatically and shut off any flow of steam, either directly through the equalizing-pipe or backflow through the oil-exit passage in case of a breakage of the sight-feed glass.

We will now proceed to describe our invention.

In the drawings, A represents the oil-reservoir; B, the condenser; C, the sight-feed glass; D, the equalizing-pipe of a locomotive-lubricator.

E is the oil-exit pipe.

$c$ is a conduit in the fitting E', leading from the top of the sight-feed glass into the exit-passage. F is a check-valve seated at a convenient point in this passage $c$, and adapted to open freely to permit oil to flow from the sight-feed glass into the oil-exit conduit, but closing with any back-pressure through the oil-exit conduit or equalizing-pipe. It is thus apparent that should the sight-feed glass C be broken this check-valve will instantly close and prevent any escape of steam from the equalizer or oil-exit passage.

G is a restricted nozzle through which steam from the equalizer and oil from the sight-feed glass are both required to pass before reaching the oil-exit conduit. This nozzle serves to neutralize pulsations of steam, which, reacting back through the oil-exit conduit, might otherwise serve to agitate and disturb the oil and water in the sight-feed glass. It also serves to direct a sharp jet of steam from the equalizer forward through the oil-exit passage when the throttle-valve of the engine is closed. This nozzle is caused to project some distance, and is provided on its outer end with a wrench-seat $g$, whereby it may be readily screwed into or out from its seat for the purpose of repairing or cleansing. It projects beyond the fitting within which it is located, so that when the lubricator is disconnected from the tallow-pipe or oil-exit conduit the engineer may with the same wrench engage the angular head of the said nozzle and unscrew it from its seat.

H is an auxiliary oiler, provided with a valve $h$ at its lower end, by loosening which oil may be passed through the auxiliary feeder to the parts to be lubricated.

$h'$ is a passage beneath from the auxiliary feeder into the oil-exit conduit, and it enters the latter in that portion into which the discharge end of the nozzle projects.

F' is a screw-plug, within which is a cavity to receive and guide the stem of the check-valve. The plug can readily be removed, and when removed the check-valve may be taken out.

The operation of the invention will now be understood. When at any time it is desired to charge the lubricator, it becomes necessary to fill the sight-feed glass with water. The check-valve, being upon its seat, prevents steam from entering through the equalizing-pipe or back through the oil-exit passage, so that condensation cannot be relied upon to fill the sight-feed glass. The engineer therefore removes the plug F' and the valve F and pours in clear water to fill the sight-feed glass, after which he replaces the valve and plug. Oil feeding through the sight-feed glass will pass freely up beneath the check-valve F and out through the nozzle G into the oil-exit passage. At the same time steam entering through the equalizer D exerts back-pressure against the check-valve, and so in the usual way neutralizes the tendency to sudden spurts of oil through the sight-feed glass at times of turning on and turning off steam from the engine. So, also, the check-valve serves to protect in a great measure the sight-feed glasses from bursting, because the valve is only open at the instant of the passage of the oil through the same, and at all other times is closed, so that the glass is shielded from the variations of pressure due to these pulsations. Again, should the glass break, the valve is closed upon its seat and prevents any escape of steam, either directly from the equalizer or back through the oil-exit conduit. Again, suppose steam to be shut off from the head of the lubricator—as, for instance, after the completion of work for the day—and while in this condition suppose the engine to be moved from its place without turning steam onto the lubricator. This check-valve will prevent the backflow of oil and water and sediment from the tallow-pipe or oil-exit conduit into the sight-feed glass. This frequently happens, and results in forcing the water back from the sight-feed glass into the oil-reservoir and condenser and filling the feed-glass with the oil and dirt. Again, the check-valve prevents the steam from churning the water in the top of the sight-feed glass, thereby overheating and injuring the packing-gaskets at the top of the glass. The nozzle G is so located with respect to the auxiliary oil-cup and its discharge-orifice $h'$ that steam rushing through the nozzle will serve as an injector to suck in the oil from the auxiliary oiler when the throttle of the engine is closed, even though the steam may be maintained at the same time at the head of the lubricator.

The construction above described is of a nature to require the removal of the check-valve in order to fill the sight-feed glass with water. We therefore show in Fig. 3 a variation of the construction which obviates the necessity of thus disturbing the check-valve. The two constructions are the same in principle so far as the operation of the lubricator and the check-valve are concerned. The plug, however, which contains the check-valve is screwed firmly to its seat, and the plug H', in which the auxiliary oiler is seated, screws down over the said plug, and we provide an independent plug $F^2$ at the side of the fitting. By removing this plug $F^2$ access may be had through the passage $f^2$ to fill the sight-feed glass with clear water without the necessity of disturbing the check-valve. Moreover, the construction shown in Fig. 3 occupies less room without the projection to receive the plug F', which is shown in Fig. 1.

It will be observed that the check-valve is located in a chamber which serves to gather condense-water from the equalizer, so that the check-valve is always seated in condense-water, and every time the valve is lifted to permit oil to pass a portion of this condense-water passes back into the sight-feed glass. This serves, when the engine is in use, to keep the sight-feed glass filled with water, and the glass has to be filled from the exterior only at the time of originally charging, or when it may at any time be desirable to fill the glass with clean water.

What we claim is—

1. In a lubricator, the combination of a sight-feed glass, a fitting at the top of said glass having a passage leading therefrom to the oil-exit conduit, a restricted throat or nozzle located in said fitting, an automatic check-valve located in said fitting back of the nozzle, and an equalizing-conduit communicating with said fitting between the nozzle and the check-valve, substantially as described.

2. In a sight-feed lubricator, the combination, with the fitting at the top of the sight-feed glass, the nozzle G, and the check-valve F, of an auxiliary feed-cup supported in the top of said fitting and communicating therewith in front of the nozzle G, substantially as described.

In testimony whereof we sign this specification in the presence of two witnesses.

ELIJAH McCOY.
CLARENCE B. HODGES.

Witnesses:
M. B. O'DOGHERTY,
SAMUEL E. THOMAS.